(12) United States Patent
Steinbuch et al.

(10) Patent No.: US 10,712,442 B2
(45) Date of Patent: Jul. 14, 2020

(54) INTEGRATED RADIO-FREQUENCY CIRCUIT, RADAR SENSOR AND OPERATING METHOD

(71) Applicant: Robert Bosch GmbH, Stuttgart (DE)

(72) Inventors: Dirk Steinbuch, Wimsheim (DE);
Goetz Kuehnle, Ludwigsburg (DE);
Matthias Steinhauer, Steinheim (DE);
Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 15/761,266

(22) PCT Filed: Aug. 1, 2016

(86) PCT No.: PCT/EP2016/068314
§ 371 (c)(1),
(2) Date: Mar. 19, 2018

(87) PCT Pub. No.: WO2017/054962
PCT Pub. Date: Apr. 6, 2017

(65) Prior Publication Data
US 2018/0267165 A1 Sep. 20, 2018

(30) Foreign Application Priority Data
Sep. 28, 2015 (DE) .................. 10 2015 218 542

(51) Int. Cl.
*G01S 13/931* (2020.01)
*G01S 7/03* (2006.01)
*G01S 13/87* (2006.01)
*G01S 13/34* (2006.01)

(52) U.S. Cl.
CPC ............ *G01S 13/931* (2013.01); *G01S 7/032* (2013.01); *G01S 13/34* (2013.01); *G01S 13/87* (2013.01); *G01S 7/034* (2013.01)

(58) Field of Classification Search
None
See application file for complete search history.

(56) References Cited

U.S. PATENT DOCUMENTS

| | | | |
|---|---|---|---|
| 2008/0278370 A1* | 11/2008 | Lachner | G01S 7/03 342/200 |
| 2015/0153445 A1* | 6/2015 | Jansen | G01S 7/032 701/93 |
| 2016/0146931 A1 | 5/2016 | Rao et al. | |

FOREIGN PATENT DOCUMENTS

EP 2881752 A1 6/2015

OTHER PUBLICATIONS

International Search Report dated Oct. 24, 2016, of the corresponding International Application PCT/EP2016/068314 filed Aug. 1, 2016.

* cited by examiner

*Primary Examiner* — Whitney Moore
(74) *Attorney, Agent, or Firm* — Norton Rose Fulbright US LLP; Gerard Messina

(57) ABSTRACT

An integrated radio-frequency circuit for a radar sensor, having a clock input that is designed to receive a clock signal produced externally to the integrated radio-frequency circuit, having a local oscillator that is designed to produce a local radio-frequency signal, having a radio-frequency input that is designed to receive an external radio-frequency signal produced externally to the integrated radio-frequency circuit, and having a changeover switch that is coupled to the local oscillator and to the radio-frequency input and is designed to change over between the local radio-frequency signal and the external radio-frequency signal for the production of a radar signal. In addition, a corresponding radar sensor and a corresponding operating method, are also described.

13 Claims, 3 Drawing Sheets

INTEGRATED RADIO-FREQUENCY CIRCUIT, RADAR SENSOR AND OPERATING METHOD

FIELD

The present invention relates to an integrated radio-frequency circuit for a radar sensor, to a corresponding radar sensor, and to a corresponding operating method.

BACKGROUND INFORMATION

Today, radar sensors are used in a large number of applications. For example, radar sensors that operate in a frequency range between 76 GHz and 81 GHz are used in vehicles for object recognition or obstacle recognition.

In radar sensors for automotive use, more and more complex sensor systems are being realized in order for example to increase the number of transmit and receive channels.

In order to limit the size of the radio-frequency modules (MMICs), which is necessary for reasons of reliability and power loss, currently an increase is being realized in the number of transmit and receive channels through the use of a plurality of dedicated additional MMICs.

A possibility for increasing the number of channels is to cascade MMICs. Here, both the clock of the master MMIC for the synchronization, and also the signal of its local oscillator, are forwarded to the cascaded MMIC for RF coherence. Along with this, both MMICs transmit on the same frequency, which is specified by the master MMIC.

SUMMARY

In accordance with an example embodiment of the present invention, an integrated radio-frequency circuit for a radar sensor is provided, having a clock input, which is designed to receive a clock signal produced externally to the integrated radio-frequency circuit, having a local oscillator that is designed to produce a local radio-frequency signal, having a radio-frequency input that is designed to receive an external radio-frequency signal produced externally to the integrated radio-frequency circuit, and having a changeover switch that is coupled to the local oscillator and to the radio-frequency input and is designed to change over between the local radio-frequency signal and the external radio-frequency signal for the production of a radar signal.

In accordance with another example embodiment of the present invention, a radar sensor is provided having at least two cascaded radio-frequency circuits according to the present invention, and having a control device that is set up to control the changeover switch of the radio-frequency circuits.

In addition, in accordance with another example embodiment of the present invention, an operating method for an integrated radio-frequency circuit for a radar sensor is provided, having the steps: receiving a clock signal produced externally to the integrated radio-frequency circuit; producing a local radio-frequency signal; receiving an external radio-frequency signal produced externally to the integrated radio-frequency circuit, and changing over between the local radio-frequency signal and the external radio-frequency signal for the production of a radar signal.

A radar sensor according to the present invention consequently has two independent radio-frequency circuits that can operate completely independently, but as needed can also be coupled to one another in terms of frequency.

The integrated radio-frequency circuit according to the present invention can, for this purpose, change over between an external and a local radio-frequency signal. For example, radio-frequency circuits, or their local oscillators, that are identical in terms of hardware can be tuned, during the frequency centering that is already required during production, in such a way that they have different center frequencies.

In this way, it is for example possible to use identical radio-frequency circuits of which a first operates in a frequency range from 76 GHz to 79.5 GHz, and a second operates in a frequency range from 77.5 GHz to 81 GHz. Thus, the entire 5 GHz frequency range standardly available for example for vehicle radar sensors, from 76 GHz to 81 GHz, is covered. Here, the first radio-frequency circuit can for example be used for the long range and the second can be used for the close range.

Here, the long range can be understood as a distance from the radar sensor of up to 250 m. The close range can be designated as a distance in front of the radar sensor of for example up to 25 m.

At the same time, a radio-frequency circuit according to the present invention also enables changing over between the local, tuned oscillator and the radio-frequency input. The same radio-frequency circuit can thus be used for different frequency ranges by changing over the radio-frequency signal that is used.

Advantageous specific embodiments and developments are described herein with reference to the Figures.

In a specific embodiment, the integrated radio-frequency circuit can have a clock output that is designed to output a clock pulse that is based on the clock signal. This enables a cascading of a plurality of radio-frequency circuits. For example, using a quartz oscillator, a clock pulse can be produced in the radio-frequency circuit from the signal of a quartz crystal, i.e., a form of the clock signal. Alternatively, the clock signal can be provided already as a clock pulse by an external quartz oscillator.

For example, a first radio-frequency circuit can be connected to an external quartz crystal via its clock input. Via the clock output, the first radio-frequency circuit can forward the clock signal of the quartz crystal to the second radio-frequency circuit. The transmission of this clock signal to the second radio-frequency circuit can be used for the temporal synchronization of the cascaded radio-frequency circuits.

In a specific embodiment, the integrated radio-frequency circuit can have a radio-frequency output that is designed to output the local radio-frequency signal. In this way, if two radio-frequency circuits are cascaded the radio-frequency signal of a radio-frequency circuit can also be forwarded. The radio-frequency input can for example remain unused in the first radio-frequency circuit, or can be used for other purposes. If it remains unused, then it can be for example connected to ground in order to avoid interference. The first radio-frequency circuit can forward the radio-frequency signal produced locally in this circuit to the second radio-frequency circuit via the radio-frequency output.

In the second radio-frequency circuit, which, as explained above, can be tuned to a different frequency range than the first radio-frequency circuit, using the changeover switch it can now be selected which signal is to be used to produce the radar signals.

The second radio-frequency circuit can consequently be used both to cover its own frequency range and to operate in the same frequency range as the first radio-frequency circuit.

If two such radio-frequency circuits are used in a single radar sensor, these can consequently each for example operate in its own frequency band, and for example can simultaneously monitor the long range at 76 GHz to 79.5 GHz and the close range at 77.5 GHz to 81 GHz. In this way it is possible to make use of the entire 5 GHz bandwidth. In contrast to this, conventional signal sources in conventional radar sensors are not capable of completely covering the 5 GHz range while meeting the demands on range (distance), temperature response, and manufacturing tolerances. Therefore, up to now typically individual radar sensors have been developed for the respective area of application (close range/long-range).

If one of the two radio-frequency circuits is changed over, so that it uses the radio-frequency signal of the other radio-frequency circuit, the information of the two radio-frequency circuits can be coherently evaluated in the overlapping frequency range. In addition, in transmit operation for example an MIMO method can be used, in which twice the number of transmit and receive channels are then available.

As described above, the radio-frequency input of the first of two cascaded radio-frequency circuits can remain unused. Alternatively, however, this circuit can also be coupled to the radio-frequency output of the second radio-frequency circuit. In this way, the local radio-frequency signal produced internally in the second radio-frequency circuit can also be used as the basis for both radio-frequency circuits.

In addition, it is now possible to operate the radio-frequency circuits separately, in an azimuthal and elevation operating mode, in order to carry out a classification of whether something can be driven over or driven under. The elevation function, in which operation takes place with a lower power level as a function of the antenna, can for example be shifted to the upper frequency band for this purpose.

In a specific embodiment, the integrated radio-frequency circuit can have a configuration interface that is coupled to the changeover switch and is designed to receive a changeover signal and to correspondingly control the changeover switch. The configuration interface can for example be realized as a digital interface that is controlled by a control device of a radar sensor or the like. In this way it is possible for a higher-level control instance to adapt the function of the individual radio-frequency circuits as needed.

In a specific embodiment, the radar sensor can have two cascaded radio-frequency circuits, the first radio-frequency circuit being designed to operate in a frequency range from 76 GHz to 79.5 GHz, and the second radio-frequency circuit being designed to operate in a frequency range from 77.5 GHz to 81 GHz.

The embodiments and developments described above can be arbitrarily combined with one another as appropriate. Further possible embodiments, developments, and implementations of the present invention also include combinations not explicitly named of features of the present invention described above or in the following, with regard to the exemplary embodiments. In particular, the person skilled in the art will also add individual aspects to the respective basic form of the present invention, as improvements or supplements.

BRIEF DESCRIPTION OF THE DRAWINGS

Below, the present invention is explained in more detail on the basis of the exemplary embodiments shown in the schematic Figures.

In all Figures, identical or functionally identical elements and devices have been provided with the same reference characters, unless otherwise indicated.

DETAILED DESCRIPTION OF EXAMPLE EMBODIMENTS

Figure 1:
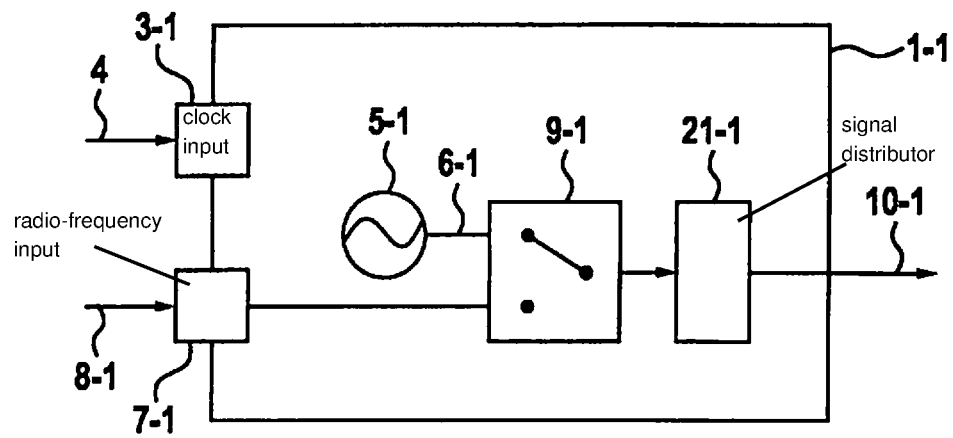
FIG. 1 shows a schematic diagram of a specific embodiment of an integrated radio-frequency circuit according to the present invention.

FIG. 1 shows a schematic diagram of a specific embodiment of an integrated radio-frequency circuit 1-1 according to the present invention.

Radio-frequency circuit 1-1 has a clock input 3-1 that receives a clock signal 4 produced externally to integrated radio-frequency circuit 1-1. The term "clock signal" 4 can be understood to mean an actual clock pulse 15, if an external quartz oscillator is used. Alternatively, however, only the quartz crystal, as resonant component, may be connected, which, together with a quartz oscillator integrated in radio-frequency circuit 1-1, represents an oscillating circuit. Here, as a consequence, the actual clock pulse 15 is first produced in radio-frequency circuit 1-1. This clock pulse 15 (see FIG. 3) is used for, inter alia, synchronization with other radio-frequency circuits (see, e.g., FIG. 3). Not shown is the further distribution of clock pulse 15 in radio-frequency circuit 1-1. Through this distribution, clock pulse 15 is distributed to those modules that require a time base e.g. for the production and modulation of radar signals 10-1. Such modules can be for example a controller in radio-frequency circuit 1-1, D/A converters in radio-frequency circuit 1-1 that produce a baseband signal, or a PLL of radio-frequency circuit 1-1.

In addition, radio-frequency circuit 1-1 has a local oscillator 5-1 that produces a local radio-frequency signal 6-1. Local oscillator 5-1 and a radio-frequency input 7-1 are coupled to a changeover switch 9-1.

An external radio-frequency signal 8-1 produced externally to integrated radio-frequency circuit 1-1 can be supplied to radio-frequency circuit 1-1 via radio-frequency input 7-1. For the production and evaluation of one or more radar signals 10-1, changeover switch 9-1 is used to change over between local radio-frequency signal 6-1 and external radio-frequency signal 8-1. In FIG. 1, following changeover switch 9-1, and representing all elements that work together in the production of one or more radar signals 10-1, a signal distributor 21-1 is shown that forwards radio-frequency signal 6-1 or 8-1 to the corresponding elements in radio-frequency circuit 1-1. For example, signal distributor 21-1 can distribute radio-frequency signal 6-1, 8-1, outputted by changeover switch 9-1, to the transmit channels of radio-frequency circuit 1-1. In addition, radio-frequency signal 6-1, 8-1 can be outputted to receivers or mixers of radio-frequency circuit 1-1 as a reference signal. Finally, signal distributor 21-1 can also produce a mixer test signal that can be used in the receivers for runtime simulation, i.e. to test the receivers.

Thus, through changeover switch 9-1 it is possible to select, in radio-frequency circuit 1-1, which radio-frequency signal 6-1, 8-1 is used for the production of radar signals 10-1. Thus, if external radio-frequency signal 8-1 is provided, having a frequency different from that of internal radio-frequency signal 6-1, then through the changeover the frequency band in which radio-frequency circuit 1-1 operates can consequently be selected very easily.

Figure 2:
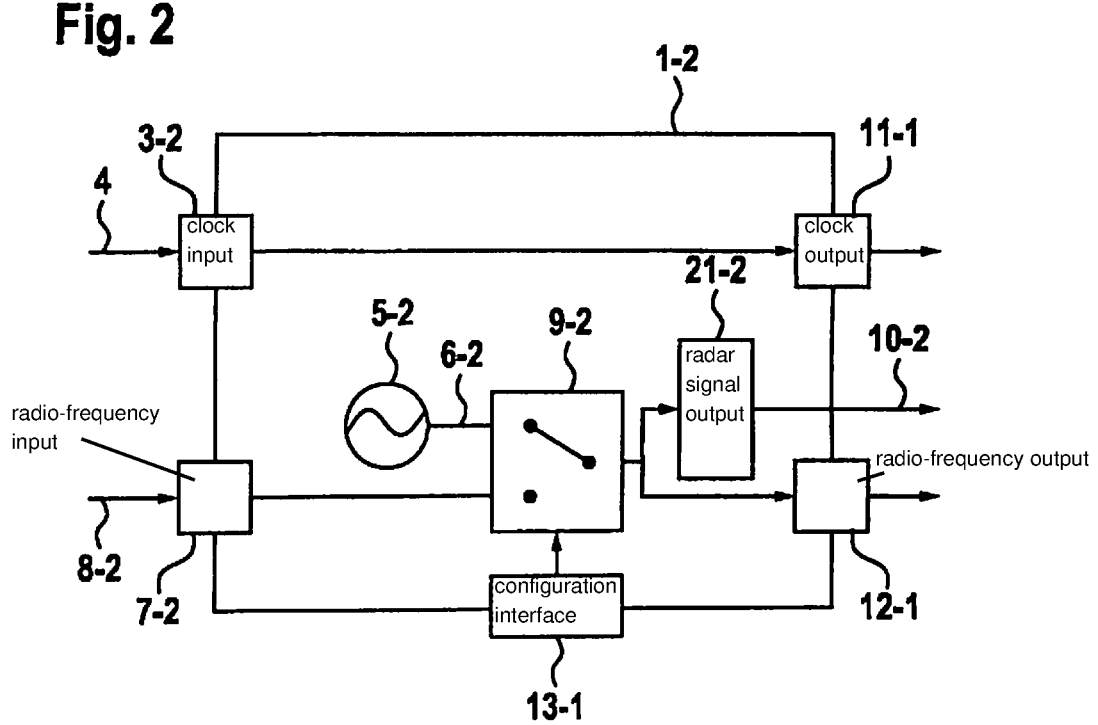
FIG. 2 shows a schematic diagram of another specific embodiment of an integrated radio-frequency circuit according to the present invention.

FIG. 2 shows a schematic diagram of a further specific embodiment of an integrated radio-frequency circuit 1-2 according to the present invention.

The radio-frequency circuit 1-2 of FIG. 2 is based on radio-frequency circuit 1-1 of FIG. 1, and in addition has a clock output 11-1 via which clock pulse 15, which radio-frequency circuit 1-2 receives for example via clock input 3-2 from a quartz oscillator, or produces internally with the aid of an external quartz crystal, can for example be forwarded to another radio-frequency circuit. In addition, a radio-frequency output 12-1 is provided via which the radio-frequency signal 6-2, 8-2, outputted by changeover switch 9-2, can likewise be forwarded for example to another radio-frequency circuit. Finally, a configuration interface 13-1 is provided via which changeover switch 9-2 can be controlled.

Consequently, radio-frequency circuit 1-2 of FIG. 2 makes it possible to receive and forward both clock pulse 15 and radio-frequency signal 6-2, 8-2. Therefore, with this configuration a cascading of a plurality of radio-frequency circuits 1-2 is very easily possible. Here, through a suitable controlling in each of the radio-frequency circuits 1-2 it can be selected which radio-frequency signal 6-2, 8-2 is used by the respective radio-frequency circuit 1-2 for the signal production and signal evaluation and for forwarding.

Figure 3:
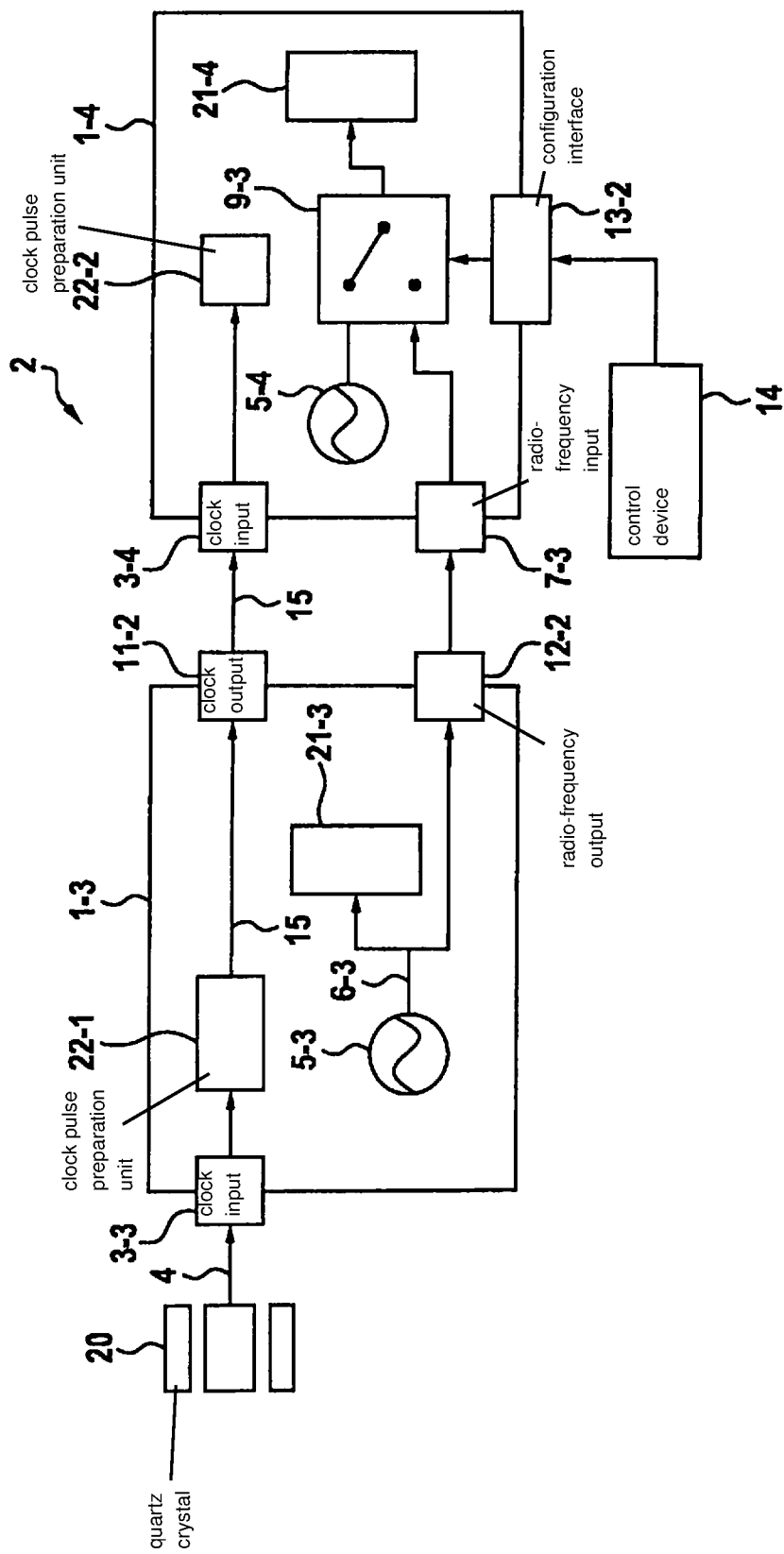
FIG. 3 shows a schematic diagram of a specific embodiment of a radar sensor according to the present invention.

FIG. 3 shows a schematic diagram of a specific embodiment of a radar sensor 2 according to the present invention that makes use of the possibility of cascading a plurality of radio-frequency circuits 1-3, 1-4.

Radar sensor 2 has a first radio-frequency circuit 1-3 that has a clock input 3-3 that obtains clock signal 4 from a quartz crystal 20. Alternatively, radio-frequency circuit 1-3 can receive clock signal 4 in the form of clock pulse 15 from an external quartz oscillator. Clock signal 4 is supplied to a clock pulse preparation unit 22-1 that prepares clock pulse 15 both for use in radio-frequency circuit 1-3 and for forwarding to radio-frequency circuit 1-4. For this purpose, radio-frequency circuit 1-3 has a clock output 11-2 that is coupled to a clock input 3-4 of radio-frequency circuit 1-4. Clock preparation unit 22-1 can for example have a quartz oscillator required by the quartz crystal, and, as stated above, can prepare the clock pulse for a controller, D/A converter, or other modules in radio-frequency circuit 1-3. In addition, the clock pulse can also be forwarded to control device 14 or a communication interface (not shown separately) of radar sensor 2. Such a communication interface can be for example a FlexRay or Ethernet controller.

Not shown in radio-frequency circuit 1-3 is the radio-frequency input, because this input is not used. In radio-frequency circuit 1-3, only local oscillator 5-3 is used to produce a radio-frequency signal 6-3 that is used in radio-frequency circuit 1-3 for the production and evaluation of radar signals. At the same time, radio-frequency signal 6-3 is forwarded, via radio-frequency output 12-2, to a radio-frequency input 7-3 of radio-frequency circuit 1-4. Because only one internal radio-frequency signal 6-3 is used in radio-frequency circuit 1-3, the configuration interface is also not shown for the sake of clarity. Of course, this interface can however be used for other tasks, and is present in radio-frequency circuit 1-3.

Consequently, radio-frequency circuit 1-4 obtains both clock pulse 4 and radio-frequency signal 6-3 from radio-frequency circuit 1-3. In addition to inputs 3-4, 7-3, radio-frequency circuit 1-4 also has a clock pulse preparation unit 22-2. In addition, a local oscillator 5-4 and a changeover switch 9-3 are provided. The differences in the representation of radio-frequency circuits 1-3 and 1-4 are here intended only to illustrate the different configurations. In fact, however, two identical radio-frequency circuits can be used. Via the configuration interface 13-2, control device 14 of radar sensor 2 can select whether second radio-frequency circuit 1-4 produces and evaluates radar signals based on radio-frequency 6-3 or based on its own radio-frequency signal 6-4.

For use in a vehicle, it can for example be provided that first radio-frequency signal 6-3 is in a frequency range of 76 GHz to 79.5 GHz. Second radio-frequency signal 5-4 can be in a frequency range from 77.5 GHz to 81 GHz. In this way, radar sensor 2 can for example acquire both the long range area and also the close range, as long as different frequency bands are assigned to the close range and long range.

Radar sensor 2 thus enables both the separate evaluation of radar signals in different frequency ranges and also a coherent evaluation of the information of the two radio-frequency circuits 1-3, 1-4 in the overlapping frequency range. In particular for the coherent evaluation, it is helpful if the RF signal originates from only a single RF source. In addition, however, in transmit operation for example an MIMO method can be used in which twice as many transmit and receive channels are available, if radio-frequency circuits 1-3, 1-4 use the same frequency range, or use radio-frequency signal 5-3, which is derived from a single source.

Thus, if for example switch 9-3 is set in such a way that it outputs radio-frequency signal 5-4, the two radio-frequency circuits 1-3, 1-4 have a coherent clock pulse. However, the RF signals are incoherent. This configuration is suitable in particular for separate frequency ranges, which appropriately do not overlap. Here, evaluation is possible only within a respective radio-frequency circuit 1-3, 1-4. Radio-frequency circuits 1-3, 1-4 thus operate simultaneously, and in pulse-synchronized fashion, but in separate frequency ranges they mix only the transmit signals in the baseband that they themselves each produce.

If switch 9-3 in radio-frequency circuit 1-4 is set such that it outputs the signal present at radio-frequency input 7-3, oscillator 5-4 can for example be deactivated. The overall system, i.e. both radio-frequency circuits 1-3, 1-4, then operate with a coherent clock pulse and with RF-coherent LO signals, derived from a single oscillator. Radio-frequency circuits 1-3, 1-4 thus have a common frequency range, and evaluation is consequently possible via the two radio-frequency circuits 1-3, 1-4; for example, radio-frequency circuit 1-3 can transmit and radio-frequency circuit 1-4 can receive. Radio-frequency circuits 1-3, 1-4 thus operate simultaneously, with synchronous clock pulses, and in RF-coherent fashion, and thus mix their own transmit signals and the transmit signals produced by the other radio-frequency circuit 1-3, 1-4 into the baseband.

Not shown in FIG. 3, but also possible, is a simultaneous coupling of the radio-frequency output of radio-frequency circuit 1-4 with the radio-frequency input of radio-frequency circuit 1-3. Thus, for both radio-frequency circuits 1-3, 1-4, the frequencies of oscillators 5-3 or 5-4 can be selected.

Figure 4:
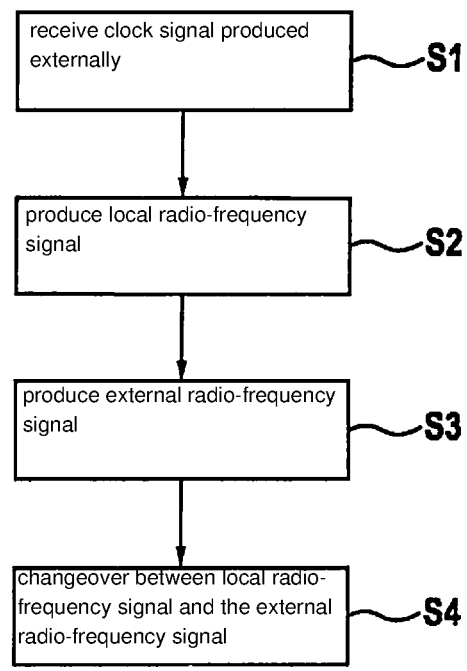
FIG. 4 shows a schematic diagram of another specific embodiment of the method according to the present invention.

FIG. 4 shows a flow diagram of a specific embodiment of the operating method according to the present invention for an integrated radio-frequency circuit 1-1-1-4 for a radar sensor 2.

The method provides the reception S1 of a clock signal 4 produced externally to integrated radio-frequency circuit 1-1-1-4. In addition, a local radio-frequency signal 6-1-6-4 is produced, in step S2. In step S3, an external radio-frequency signal 8-1-8-3, produced externally to integrated radio-frequency circuit 1-1-1-4, is produced. Finally, for the production of a radar signal 10-1, 10-2, a changeover takes place between local radio-frequency signal 6-1-6-4 and external radio-frequency signal 8-1-8-3.

Received clock signal 4 is used here for the temporal controlling or synchronization of processes in radar sensor 2, or in individual radio-frequency circuits 1-1-1-4. For the synchronization of a plurality of radio-frequency circuits 1-1-1-4, a clock pulse 15, based on clock signal 4, can also be outputted by one of the radio-frequency circuits 1-1-1-4.

If two or more of the radio-frequency circuits 1-1-1-4 in radar sensor 2 use the same frequency range for the production and evaluation of radar signals, then local radio-frequency signal 6-1-6-4 can also be outputted by a radio-frequency circuit 1-1-1-4 to other radio-frequency circuits 1-1-1-4.

Finally, the changeover between local radio-frequency signal 6-1-6-4 and external radio-frequency signal 8-1-8-3 can take place corresponding to a received changeover signal that can be provided for example by a control device 14 of the radar sensor.

Although the present invention has been described above on the basis of preferred exemplary embodiments, it is not limited thereto, but rather can be modified in many ways. In particular, the present invention can be modified in many ways without departing from the core of the present invention.

What is claimed is:

1. A radar sensor, comprising:
   at least two cascaded integrated radio-frequency circuits, each of the radio-frequency circuits including a respective clock input designed to receive a respective clock signal produced externally to the integrated radio-frequency circuit, a respective local oscillator designed to produce a respective local radio-frequency signal, a respective radio-frequency input designed to receive a respective external radio-frequency signal produced externally to the integrated radio-frequency circuit, and a respective changeover switch coupled to the respective local oscillator and to the respective radio-frequency input, and designed to change over between the respective local radio-frequency signal and the respective external radio-frequency signal for the production of a respective radar signal; and
   a control device set up to control the changeover respective switches of the radio-frequency circuits;
   wherein a first one of the radio-frequency circuits is configured to produce and evaluate radar signals in a first frequency range, and a second one of the radio-frequency circuits, different from the first one of the radio-frequency circuits, is configured to produce and evaluate radar signals in a second frequency range different from the first frequency range.

2. The radar sensor as recited in claim 1, wherein each of the radio-frequency circuits includes a clock output is designed to output a clock pulse is based on the respective clock signal.

3. The radar sensor as recited in claim 1, wherein each of the radio-frequency circuits includes a radio-frequency output designed to output at least one of the respective local radio-frequency signal, and a signal outputted by the respective changeover switch.

4. The radar sensor as recited in claim 1, wherein each of the radio-frequency circuits includes a configuration interface coupled to the respective changeover switch, and designed to receive a respective changeover signal and to control the respective changeover switch in a manner corresponding to the changeover signal.

5. The radar sensor as recited in claim 1, wherein the first frequency range is from 76 GHz to 79.5 GHz, and the second frequency range is from 77.5 GHz to 81 GHz.

6. The method as recited in claim 1, further comprising:
   outputting, by each of the integrated radio-frequency circuits, the respective local radio-frequency signal.

7. The device as recited in claim 1, wherein the first one of the integrated radio-frequency circuits is configured to produce the radar signals in the first frequency range using the respective local oscillator of the first one of the integrated radio-frequency circuits, and the second one of the integrated radio-frequency circuits is configured to produce the radar signals in the second frequency range using the respective local oscillator of the second one of the integrated radio-frequency circuits.

8. An operating method for a radar sensor including at least two cascaded integrated radio-frequency circuits, comprising:
   receiving, by each of the integrated radio-frequency circuits, a respective clock signal produced externally to the integrated radio-frequency circuit;
   producing, by each of the integrated radio-frequency circuits, a respective local radio-frequency signal in the integrated radio-frequency circuit;
   receiving, by each of the integrated radio-frequency circuits, respective external radio-frequency signal produced externally to the integrated radio-frequency circuit; and
   changing over, by each of the integrated radio-frequency circuits, between the respective local radio-frequency signal and the respective external radio-frequency signal, for the production of a respective radar signal;
   wherein a first one of the integrated radio-frequency circuits is configured to produce and evaluate radar signals in a first frequency range, and a second one of the integrated radio-frequency circuits, different from the first one of the integrated radio-frequency circuits, is configured to produce and evaluate radar signals in a second frequency range different from the first frequency range.

9. The method as recited in claim 8, further comprising:
   outputting, by each of the integrated radio-frequency circuits, a respective clock pulse, which is based on the respective clock signal, from the radio-frequency circuit, for another radio-frequency circuit.

10. The method as recited in claim 8, wherein the changeover by each of the integrated radio-frequency circuits, between the respective local radio-frequency signal and the respective external radio-frequency signal takes place corresponding to a respectively received changeover signal.

11. The method as recited in claim 8, wherein the first frequency range is from 76 GHz to 79.5 GHz, and the second frequency range is from 77.5 GHz to 81 GHz.

12. A radar sensor, comprising:
   at least two cascaded integrated radio-frequency circuits, each of the radio-frequency circuits including a respective clock input configured to receive a respective clock signal produced externally to the integrated radio-frequency circuit, a respective local oscillator configured to produce a respective local radio-frequency signal, a respective radio-frequency input configured to receive a respective external radio-frequency signal produced externally to the integrated radio-frequency circuit, and a respective changeover switch coupled to the respective local oscillator and to the respective radio-frequency input, and configured to change over between the respective local radio-frequency signal and the respective external radio-frequency signal for the production of a respective radar signal; and a control device set up to control the changeover respective switches of the radio-frequency circuits;

wherein the respective local radio-frequency signal produced by the respective local oscillator of a first one of the radio-frequency circuits is in a first frequency range, and the respective local radio-frequency signal produced by the respective local oscillator of a second one of the radio-frequency circuits, different from the first one of the radio-frequency circuits, is in a second frequency range different from the first frequency range.

13. The radar sensor as recited in claim 12, wherein the first one of the radio-frequency circuits has a respective radio-frequency output configured to output the respective local radio-frequency signal produced by the respective local oscillator of the first one of the radio-frequency circuits, the respective radio-frequency output of the first one of the radio-frequency circuits being connected to the respective radio-frequency input of the second one of the radio-frequency circuits, and wherein the respective changeover switch of the second one of the radio-frequency circuits is configured to change over between the respective local radio-frequency signal produced by the respective local oscillator of the second one the radio-frequency circuits and the respective local radio-frequency signal produced by the respective local oscillator of the first one of the radio-frequency circuits.

\* \* \* \* \*